United States Patent
Ibanez-Guzman et al.

(10) Patent No.: US 9,317,033 B2
(45) Date of Patent: Apr. 19, 2016

(54) CONTROL OF THE AUTONOMOUS MODE OF BIMODAL VEHICLES

(71) Applicant: RENAULT s.a.s., Boulogne-Billancourt (FR)

(72) Inventors: Javier Ibanez-Guzman, Raizeaux (FR); Nicoleta Minoiu-Enache, Versailles (FR); Hugo Guillermo Chale Gongora, Chatillon (FR); Jean Lesaing, Igny (FR); Francois Chauveau, Dampierre (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/365,941

(22) PCT Filed: Dec. 6, 2012

(86) PCT No.: PCT/EP2012/074676
§ 371 (c)(1),
(2) Date: Jun. 16, 2014

(87) PCT Pub. No.: WO2013/087514
PCT Pub. Date: Jun. 20, 2013

(65) Prior Publication Data
US 2014/0358353 A1     Dec. 4, 2014

(30) Foreign Application Priority Data

Dec. 16, 2011    (FR) ...................................... 1161773

(51) Int. Cl.
*G05D 1/00*        (2006.01)
*G05D 1/02*        (2006.01)

(52) U.S. Cl.
CPC ............ *G05D 1/0027* (2013.01); *G05D 1/0061* (2013.01); *G05D 1/0297* (2013.01)

(58) Field of Classification Search
CPC .. G05D 1/0027; G05D 1/0061; G05D 1/0297
USPC .......................................................... 701/23
See application file for complete search history.

(56) References Cited

U.S. PATENT DOCUMENTS

| | | | |
|---|---|---|---|
| 6,181,991 B1 | 1/2001 | Kondo et al. | |
| 6,336,295 B1 | 1/2002 | Takei et al. | |
| 7,181,409 B1 * | 2/2007 | Murakami et al. | ............... 705/5 |
| 8,078,349 B1 | 12/2011 | Gomez et al. | |
| 8,321,067 B1 | 11/2012 | Gomez et al. | |
| 2010/0250023 A1 * | 9/2010 | Gudat | ............................... 701/2 |

OTHER PUBLICATIONS

International Search Report Issued Feb. 25, 2013 in PCT/EP12/074676 Filed Dec. 6, 2012.

* cited by examiner

*Primary Examiner* — Rodney Butler
*Assistant Examiner* — Anne Mazzara
(74) *Attorney, Agent, or Firm* — Oblon, McClelland, Maier & Neustadt, L.L.P.

(57) ABSTRACT

A control of autonomous vehicles, and a method for controlling at least one autonomous ground vehicle configured to adopt two operating modes, including a manual mode in which the driving depends on driving instructions from the driver of the vehicle, and an autonomous mode, in which the driving depends on data received from sensors configured to provide information on surroundings of the vehicle, and on data received by a navigation system, the method including: authorizing the autonomous mode only when the vehicle is within an area determined by defined boundaries; receiving reservation data from a user interface; generating a set message to be transmitted to the vehicle in accordance with the received reservation data; and transmitting the set message to the vehicle such that the vehicle autonomously performs a movement corresponding to the transmitted set message.

16 Claims, 1 Drawing Sheet

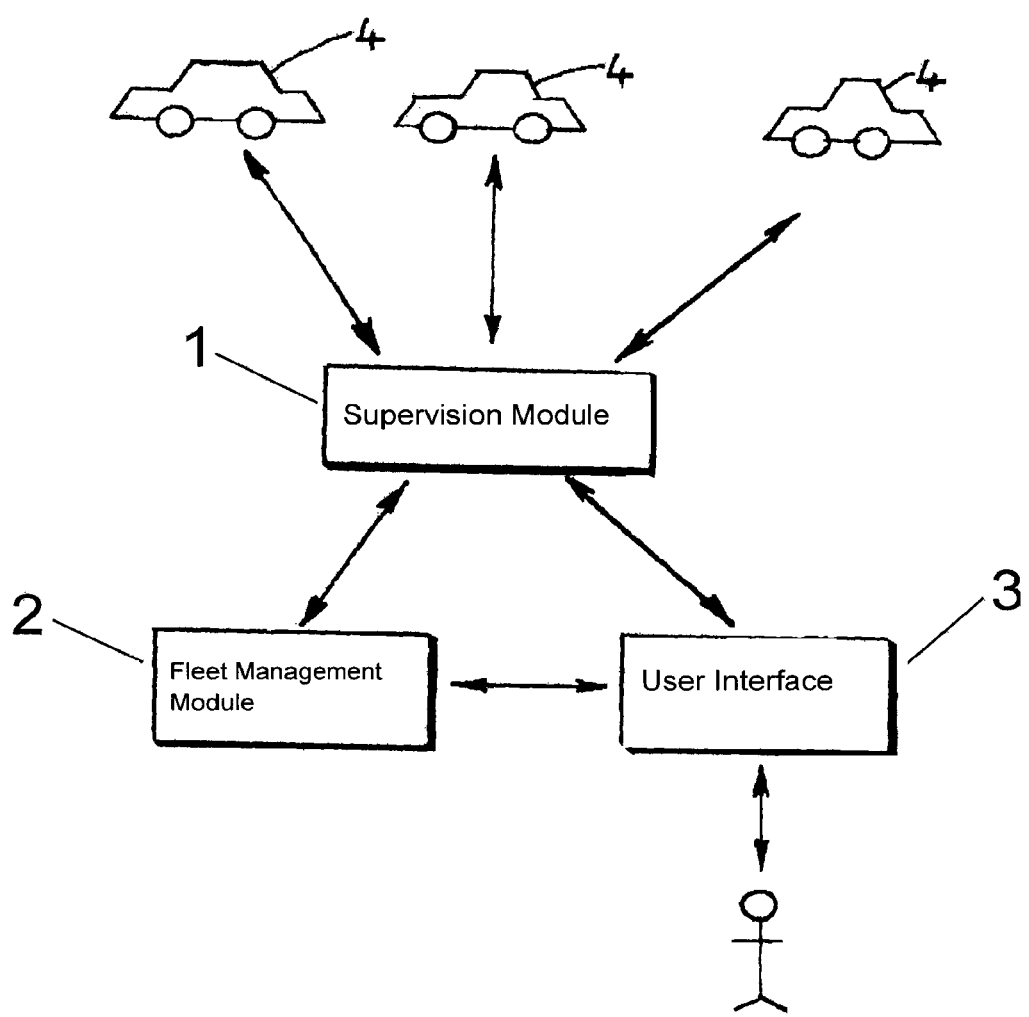

CONTROL OF THE AUTONOMOUS MODE OF BIMODAL VEHICLES

The invention pertains to the technical sector of terrestrial autonomous vehicles (or "Autonomous Unmanned Ground Vehicles").

Several studies have been conducted in the last few years to demonstrate the feasibility of automated driving based on leading technical solutions.

Vehicles have been developed to allow driverless driving. These vehicles comprise a user interface allowing the passenger to input a destination address, location means based on GPS type receivers, a set of sensors able to provide sufficient information about the immediate environment of the vehicle, and means for processing data received so as to manage the driving in such a way as to arrive at the destination. These vehicles thus allow a person who does not know how or does not wish to drive to be conveyed from one point to another according to his desire.

For example, document U.S. Pat. No. 8,078,349 discloses methods and devices for passing from a mode of human driving to an autonomous mode of vehicle driving by conveying the vehicle to a predetermined position from which it can thereafter move in an autonomous manner.

Document US2010/250023 discloses a system and a method for operating a machine selectively in a manual mode, in a remotely controlled mode and in an autonomous mode.

Document U.S. Pat. No. 5,774,069 discloses an automatic driving control unit which can switch a vehicle from an automatic mode to a manual mode at a determined point.

A need nonetheless exists for a method and a device which are more appropriate to the needs of most users.

There is proposed a method of control of at least one autonomous terrestrial vehicle able to adopt two modes of operation, said modes comprising:
  a manual mode, in which driving is dependent on vehicle driver commands, for example manual commands for steering wheel rotation, brake pedal depression, etc., and
  an autonomous mode, in which driving is dependent on data received from sensors able to provide information about the environment of the vehicle and on data received from a navigation system.

The method comprises a step consisting in authorizing the autonomous mode only when the vehicle is situated in a determined site.

This step can be performed within the vehicle, or else by a remote server.

Thus, the vehicle can operate in an automated manner when it is situated on a given site, for example a campus or a space dedicated to car rental.

The vehicle is also able to operate in manual mode. Thus, the driver is prompted to drive the vehicle so as to perform useful movements. The movements within the site can be performed although the vehicle is passengerless. These movements within the site can thus be as it were transparent to the user.

The method can advantageously comprise, when the vehicle is in autonomous mode, the transmission to the vehicle of a directive message so that the vehicle carries out in an autonomous manner a movement corresponding to this directive message. The directive message can thus define a mission to be performed.

In autonomous mode, the vehicle receives a directive message for example from a remote server. For example, initially, the vehicle receives a mission order which determines the way in which the latter will operate once it is in autonomous mode and which includes information about the driver who will take charge of the vehicle in manual mode. This message is dispatched from a server which manages the missions of the autonomous vehicles.

The directive message can for example comprise a destination address. The vehicle then moves in an autonomous manner, by using its resources of the sensor and GPS receiver type, to the spot corresponding to this address.

Provision may be made to transmit a mission order comprising several directive messages, providing information such as a destination address, a date of the movement, a rendezvous time, a value of minimum charge stored in the batteries of the vehicle (if the latter is electric), the name and the data of the user, information about the traffic on the site or information relating to a profile of circuit to be traveled by the vehicle in autonomous mode, etc. The content of the mission can be decoded on board the vehicle, in such a way that this vehicle can fulfill a set of tasks in autonomous mode and facilitate handover on passing to manual mode. The vehicle then moves in an autonomous manner, using resources of the exteroceptive sensor and GPS receiver type, to the spot corresponding to the destination address received.

The invention is in no way limited by the form of the directive message nor by its content, provided that this message makes it possible to trigger the movement of the vehicle. For example, the directive message can comprise indications so as to impose a given route, a value of a parameter indicative of the significance ance of the movement, or the like.

Advantageously and in a nonlimiting manner, the method can furthermore comprise a step of receiving booking data arising from a user interface. The directive message is formulated as a function of the booking data received.

Thus the server imposing on the vehicle its movements can be in communication with a user interface of the terminal type, for example a booking facility, a personal computer, an intelligent telephone ("smartphone"), or the like. The potential user inputs a booking request with a desired booking date, and optionally a desired place of rendezvous. The directive message is formulated on the basis of the data input by the user.

For example, the method can comprise a step of determining the destination address as a function of the booking data received.

For example, a server manages a pool of several vehicles on a determined site. A user makes a booking request by inputting a desired place of rendezvous, within the site, and a desired rendezvous date. On the basis of these data, the server selects a vehicle from the pool and generates a message dispatch date and a destination address. On the dispatch date thus generated, the server transmits a message to the selected vehicle, this message transporting the destination address, for example coordinates of a navigation system.

According to another example, the message can be dispatched to the vehicle as soon as the rendezvous date and address are determined. The vehicle receives a message with a date and an address, keeps these data, and when the date approaches, for example half an hour before the date, moves in an autonomous manner to the spot corresponding to the address.

The invention is not limited by the form of the destination address: it may for example involve navigation data, an item indicative of a spot whose geographical coordinates are pre-recorded, or the like.

Provision may be made for the site to comprise just a single rendezvous spot, in which case the determination of the destination address subsequent to a booking request is trivial. Wherever the vehicle is on the site, it receives a message from the server obliging it to go to the place of rendezvous.

Advantageously and in a non-exhaustive manner, the method can furthermore comprise a step of detecting a possible problem.

In case of detection, the method can comprise a step of emitting an alarm signal and/or a step of dispatching at least one message so as to assist the vehicle, for example a step of dispatching a message to prohibit the vehicle from any movement. This dispatching can be performed from the server to the vehicle.

Advantageously and in a non-exhaustive manner, the method can furthermore comprise the reception of at least one item of state information in respect of the autonomous vehicle. This item of information may be output by the vehicle and received by the server.

The directive message can be formulated as a function of this at least one item of information received.

For example, the information received can comprise a state of charge of the battery, in particular if the vehicle is equipped with a traction battery, or else a parameter value characterizing the wear of the brakes. According to the information received, it is possible to oblige the vehicle to go to a recharging facility, or else to the garage, so as to replace the brake pads.

This method thus makes it possible to avoid the need for human users to be in charge of at least some of the maintenance operations. The vehicle moves by itself to the recharging facilities, to the garage or the like, so that at least some of the vehicle maintenance operations become transparent to the user.

Advantageously and in a non-exhaustive manner, provision may be made for the vehicle to display a message allowing the garage mechanic to perform the appropriate operation, for example "add oil", or else "cleaning to be performed".

Advantageously and in a non-exhaustive manner, the method can make it possible to manage a plurality of autonomous vehicles.

Advantageously and in a non-exhaustive manner, the method can furthermore comprise a step of estimating a spatial distribution of the plurality of vehicles. This step can be performed as a function of data input arising from at least one user interface and/or as a function of established statistical data.

The method can furthermore comprise a step of emitting at least one directive message destined for at least one vehicle, as a function of the estimated distribution.

The server can generate the directive message as a function of the estimated distribution and transmit this message to the autonomous vehicle.

This distribution can be estimated as a function of the actual needs, such as received from one or more user interfaces, and/or assumed needs. For example, for a pool of autonomous vehicles, statistical usage data may be utilizable to determine that at such a time of day such a number of vehicles will be necessary at such a location. The method can thus make it possible to ensure fleet management.

There is furthermore proposed a computer program product comprising instructions for performing the steps of the method described hereinabove when the program is executed by a processor.

These instructions can for example be programmed into a processor, for example a microprocessor, a microcontroller, a DSP ("Digital Signal Processor"), or the like.

There is furthermore proposed a device for control of at least one autonomous vehicle, and advantageously of a plurality of autonomous vehicles, each autonomous vehicle being able to adopt two modes of operation, these modes comprising:

a manual mode, in which driving is dependent on vehicle driver commands, and an autonomous mode, in which driving is dependent on data received from sensors able to provide information about the environment of the vehicle and on data received from a navigation system.

The device comprises processing means designed to authorize the autonomous mode only when the vehicle is situated in a determined site.

This device can thus make it possible to implement the method described hereinabove.

This device can furthermore comprise transmission means for transmitting a directive message so that the vehicle carries out in an autonomous manner a movement corresponding to this directive message.

In the case of a remote control device, the communication between the autonomous vehicle or vehicles and the control device can be ensured by short, medium or long range wireless communication means. Provision may for example be made to use networks of the telephone network, Internet and/or other type to ensure the communication.

Advantageously and in a nonlimiting manner, the control device can comprise reception means, for example a radio receiver, an input port, or the like, for receiving at least one item of vehicle state information.

The control device can comprise processing means designed to formulate a directive message intended for the vehicle as a function of the item or items of information received.

Advantageously and in a nonlimiting manner, the control device can be situated remotely from the vehicle.

Advantageously and in a nonlimiting manner, the control device can be designed to receive data from a plurality of autonomous vehicles and to supervise each vehicle of this plurality of autonomous vehicles. The management of this plurality of autonomous vehicles is thus centralized. For each vehicle, the control device determines as a function of the information received from this vehicle whether the vehicle must perform certain movements for maintenance purposes. Furthermore making provision for a single control device for a given pool of vehicles makes it possible to economize on hardware.

Advantageously and in a nonlimiting manner, processing means of the control device can be devised so as to estimate a distribution of this plurality of vehicles, and to transmit to at least some of the vehicles of this plurality commands of the directive messages so as to achieve or to approach the estimated distribution.

Advantageously and in a nonlimiting manner, the processing means of the control device can be devised so as to detect a possible problem, and to emit an alarm signal should a problem be detected and/or at least one message to the vehicle so as to assist the vehicle. If the problem detected is a malfunction of the vehicle itself, for example a failure to start, then provision may be made for a step of emitting an alarm.

For example, for each autonomous vehicle the control device can receive management and speed information in respect of this autonomous vehicle; the control device can compare the position information received at diverse instants; if it turns out that the placement of the vehicle is not changing, although the vehicle ought to be moving, an alarm can be emitted so that a technician moves and performs a human diagnosis or so that a procedure onboard the vehicle is triggered.

The alarm can be visual, audible and/or the like.

The control device can for example be designed to receive a speed item of information in respect of the vehicle and compare this speed value with a maximum speed threshold. If the speed value received exceeds the maximum value, the control device can emit a message ordering the vehicle to remain stationary or to park at a determined spot.

Should a problem be detected, provision may be made for the control device to oblige the vehicle to remain stationary. In this case, the control device can for example transmit to the vehicle a destination address whose location data correspond to a position close to that where the vehicle was situated at the moment the problem was detected.

The invention can advantageously involve the use of behavior rules associated with a digital representation, stored in the device for control of their behavior, of the journey of the vehicles. These rules make it possible for example to impose behavior constraints on the autonomous vehicles according to the zone within which they are deploying, such as a charging zone where the vehicles must travel at low speed.

Advantageously and in a nonlimiting manner the control device can be in communication with a user interface.

Thus, the control device can take into account the desires of the user in the supervision of the vehicle or vehicles. For example, the user can make a vehicle booking request via the user interface.

The control device can advantageously make it possible to manage not only an autonomous vehicle and the other vehicles of a given pool, but furthermore equipment of the site in communication with the control device, for example sensors installed on the site. One then speaks of an ecosystem.

The control device can for example comprise:
  means for detecting the state of the ecosystem of the vehicle,
  processing means for formulating, as a function of the data received from the means for detecting, directive messages so that the vehicle moves in a secure manner in autonomous mode.

The control device can advantageously comprise means for recording and compiling the information relating to the ecosystem and to the behavior of the vehicle so as to obtain statistical data, to allow the training of the control device and the adaptation of behavior rules to the actual conditions of use of the vehicles.

The invention can find numerous applications. For example, the control device can equip an autonomous vehicle belonging to an individual, so as to allow this person to avoid being responsible himself for the non-useful movements, such as movement for maintenance or parking purposes. This individual may optionally be a dependent person.

Provision may for example be made for an application of the taxi type. A user orders, for example from a mobile telephone terminal, a vehicle at an address and at a given date. The mobile terminal transmits these data to the control device, which emits a directive message so that the vehicle moves in an autonomous manner so as to be available at the date and at the place desired.

The control device is in communication, via wireless communication means, with a pool of vehicles on a determined site, that is to say with defined boundaries. These boundaries may or may not be delineated for example by barriers.

The control device may be responsible for distributing the various vehicles as a function of the actual or assumed needs, for ensuring the maintenance of the diverse vehicles, and for signaling possible problems detected to an authorized person.

The control device is thus designed to supervise a certain number of movements intended to be performed although the vehicle is a priori empty. These movements are carried out in an autonomous manner by the vehicle.

When a user boards the vehicle, provision may be made for the vehicle to pass from a mode of autonomous operation to a mode of manual operation, so as to let the user drive the vehicle during the useful movement, or not. In particular, in the case of a vehicle intended for an elderly and/or dependent person, provision may be made for the vehicle to retain a mode of automatic operation despite the presence of the passenger. Stated otherwise the vehicle can operate in a bimodal or non-bimodal manner.

The processing means can comprise a processor core, a processor, and/or the like. The reception means can for example comprise input wires, an input port, an input bus and/or the like. Communication means of the vehicle can for example comprise output wires, wireless send/receive means, or the like. The transmission means can for example comprise wireless send/receive means, output wires or the like.

Advantageously and in a nonlimiting manner, the device can integrate at one and the same time:
  a supervision module for transmitting the directive messages and for assisting the vehicles in their movements when said vehicles are in autonomous mode,
  means of communication with a user interface for receiving booking data arising from said user interface,
  a fleet management module in communication with the supervision module and with the communication means for ensuring the maintenance of the vehicles and/or for optimizing the spatial distribution of the vehicles on the site.

Such a platform thus makes it possible to control the vehicles in autonomous mode, taking into account the booking requests and also the state of the vehicles.

The means of communication with the user interface can comprise wireless communication means, for example a WiFi antenna, or else an Ethernet port, an input bus, and/or the like.

There is furthermore proposed an autonomous/manual bimodal terrestrial vehicle comprising reception means for receiving messages arising from a control device such as described hereinabove, for example an automotive vehicle.

The autonomous vehicle can advantageously comprise transmission means for dispatching messages to the control device. The reception means and/or the transmission means can be wireless.

There is furthermore proposed an assembly comprising at least one autonomous vehicle, and the control device described above. This assembly can advantageously furthermore comprise at least one user interface.

The autonomous vehicle can be electric, hybrid or the like.

The invention will be better understood with reference to FIG. 1, which shows a block diagram of an exemplary system of autonomous vehicles, according to an embodiment of the invention.

With reference to FIG. 1, a device for control of autonomous vehicles comprises a supervision module 1 and a fleet management module 2. The modules 1, 2 are in communication with a user interaction system 3, also termed a user interface.

This user interaction system can for example comprise a terminal of the computer type, of the mobile telephone type, and/or the like.

Each vehicle 4 is a bimodal vehicle. Stated otherwise, the vehicle 4 is capable of ensuring autonomous driving and is also capable of being driven manually, according to the desired mode of operation.

In one embodiment, provision may be made to prohibit any automatic activation of the vehicle when there is or are one or more passengers on board this vehicle.

In another embodiment, provision may be made for the driving to remain automatic but, if manual operation is necessary, for the supervision module 1 to be able to force the autonomous vehicle to switch to the mode of manual driving.

Supervision Module

The supervision module 1 is in communication with an assembly of autonomous vehicles 4.

The supervision module dispatches directive messages to the vehicles 4, so as to impose determined movements on these vehicles 4 when they are in autonomous mode.

Also, the module 1 receives data arising from the vehicles in autonomous mode 4.

By way of illustration, the control device receives position information in respect of the vehicle, arising for example from a positioning system of GPS ("Global Positioning System") type. The control device furthermore receives a speed item of information in respect of the vehicle, thus information about the hazard warning lights, the use of the windshield wipers, the activation of the ESP ("Electronic Stability Program") and the like make it possible to supervise the behavior of the autonomous vehicles. Information arising from sensors integrated into the vehicle, for example an oil level sensor, or the like, may furthermore be received, as may information arising from processors, for example processors programmed to estimate brake pad state of wear, or the like; this information also makes it possible to ensure the management of the vehicle so as to ensure its availability.

The supervision or surveillance module 1 (or "Integrity System") makes it possible to verify the status of the major processes upon starting, so as to identify whether these processes are effective.

State information in respect of the autonomous vehicles is logged and/or determined as a function of a previously received data set. The information characterizing the state of a vehicle comprises the position of this vehicle, the orientation of the vehicle, the speed of the vehicle, possible alert messages or the like. These observations are performed in real time.

This state information is recorded in a periodic manner. The vehicle state information logged is stored in memory.

Furthermore the module 1 makes it possible to assist the vehicles in their movements in autonomous mode.

In particular, the supervision module 1 is devised in such a way as to detect certain problems, so as to ensure the integrity of the assembly of vehicles and of the control device.

For example, the module 1 is designed to verify the agreement between an actual trajectory of a vehicle and the programmed trajectory. Accordingly, the module 1 receives from the vehicle 4 position information in respect of this vehicle, for example of latitude and longitude values, and verifies that this position information comes within a set of position data corresponding to the programmed trajectory. If the module 1 detects that the vehicle 4 is straying too far from the programmed trajectory, an alarm signal can be emitted, and/or the module 1 can dispatch a query message to the vehicle concerned 4 so as to obtain an item of information as regards the reasons that led to this deviation in trajectory.

For example again, the supervision module 1 is equipped for remotely signaling a presence of emergency service vehicle in proximity to the autonomous vehicle or for remotely signaling a presence of obstacle obstructing the path to be traveled by the vehicle in autonomous mode.

The module 1 is furthermore devised so as to verify that certain rules, for example rules relating to the safety distances between vehicles or the like, are properly complied with. In case of violation of the rules, or else if another anomaly appears, safety processes are enabled so as to ensure the safety of the entities and the overall integrity of the system.

The enabling of these safety processes may entail the dispatching of new directives to the autonomous vehicle, so as to ensure the success of the original mission, or else to resolve a safety problem.

The directive messages emitted may for example convey destination addresses to be reached, speed values not to be exceeded, or the like.

The supervision module 1 may furthermore be in communication with equipment, for example video surveillance cameras, not represented, installed on a site for example, or coming from other vehicles, autonomous or not. This information makes it possible to observe the path which must be followed by the autonomous vehicles. The module 1 can utilize the information received from this equipment. The information arising from this equipment can for example make it possible to determine whether or not the initially defined roads are in fact usable.

This observation equipment may furthermore provide information making it possible to assist the autonomous vehicles during the execution of complex maneuvers. For example, if a road is blocked by a parked vehicle, the sensors onboard the autonomous vehicles may turn out to be insufficient to provide the information required for carrying out an overtaking maneuver. In this case, the information arising from the surveillance cameras may make it possible to generate, within the supervision module 1, information to facilitate the planning of the trajectories of the autonomous vehicle. Stated otherwise, the field of view of the vehicle may be widened by information provided by sensors present in the infrastructure.

The driving related decisions are made as a function of the information arising from the sensors onboard the vehicle, and as a function of the information optionally provided by the surveillance cameras. The maneuver decisions are taken locally, by processing means of the autonomous vehicle.

The vehicle state information of the position, orientation, speed or other type is recorded in a memory of the module 1, and compiled in a periodic manner so as to obtain statistical data and allow training of the ecosystem of the vehicles. These statistical data may make it possible to improve the information flow and the response of the module 1. For example, these data may make it possible to establish a mean speed of movement advocated at certain locations.

The supervision module 1 can furthermore allow an observer to move an autonomous vehicle remotely for maneuvers in case of emergency, by using techniques of navigation from waypoint to waypoint (or "waypoint navigation"). The module 1 successively dispatches directive messages to the vehicle, each directive message indicating a given waypoint in the guise of destination address. The vehicle is thus led to perform the maneuver corresponding to this succession of waypoints.

Fleet Management Module

The fleet management module 2 comprises a server, not represented, comprising a memory, not represented, for storing a database. This module 2 makes it possible to ensure the logistics of the autonomous vehicles 4 by managing the recharging of the batteries, the storage, the parking and the use of the vehicles 4.

This module 2 can make it possible to ensure the optimization of a pool of autonomous vehicles, and their availability for the users.

For each vehicle 4, parameters relating to this vehicle are stored in the database. These parameters can include dynamic information, such as missions, a state of charge of the batteries, planning of usage and or the like. Some of these parameters may be received from the module 1, for example a battery state of charge measured by the vehicle itself, or else an actual position of the vehicle.

The module 2 furthermore receives booking requests arising from the user interface 3.

The battery charge required to ensure a mission announced by the user is calculated as a function of the profile of the road, foreseeable bottlenecks and foreseeable weather (to make it possible to stow on board the energy required for thermal comfort in the cabin).

The recharging regime for the vehicles can also be controlled through the electricity supplier's dynamic tariff rates or any other constraint.

The module 2 is furthermore designed to keep old booking data in memory and to establish statistics on the basis of these old booking requests. The module 2 can thus estimate a distribution of the vehicles corresponding to an estimation of all the future booking requests. The module 2 performs for example a reading of statistical data arising from earlier bookings.

The module 2 is thus designed to choose, as a function of several parameters, including the current booking requests, the state of charge of the batteries of the available vehicles, statistics obtained on the basis of earlier bookings, etc., a vehicle able to carry out such and such a mission. A directive message defining a mission plan is then dispatched to this vehicle, via the module 1.

The module 2 can furthermore emit directive messages destined for the non-selected vehicles, for example to dispatch these vehicles to a recharging station. The directive messages emitted then comprise a destination address corresponding to the recharging station closest to the recipient vehicle for which the message is destined. These messages are received by the module 1, and then retransmitted to the vehicles 4.

The fleet management module can be programmed so as to define sessions for authorized people, termed fleet management managers.

The fleet managers connect up and open a session via the Internet. Once connected, the fleet managers can access the various services on offer:
- management of user bookings,
- management of vehicle maintenance,
- management of vehicle recharging,
- control of vehicle status,
- control of the progress of the missions of the vehicles and of the correct use in accordance with the specified missions.

The control device can be devised so as to authorize the fleet managers to perform certain actions, in particular authorize, cancel or change a booking of an autonomous vehicle, replace an autonomous vehicle with another vehicle for a given mission, plan the maintenance operations on the autonomous vehicles, manage the recharging of the vehicles, activate or deactivate the mode of automatic driving under certain conditions, or the like.

The fleet managers receive the information regarding emergency situations by telephone directly from the user, or else through a message, for example an email or an SMS ("short message service") emitted by the surveillance module 1 should a problem with an autonomous vehicle be detected. Provision may be made to create a specific telephone number for managing user emergency situations.

The information is taken into account by the fleet managers who can then define an appropriate action plan, for example dispatch a technician to the location defined by navigation data received from the vehicle. If the problem relates to a booking, the fleet managers can connect up and open a session so as to undertake the necessary action, for example a cancellation, a return to the specific location or the like.

During maintenance operations, provision may be made for the autonomous vehicle to be unavailable for booking. The booking of the maintenance operation can be recorded with an identifier number like a user booking.

Autonomous Vehicle

The autonomous vehicle 4 is an electric series vehicle having functions which allow it to move in an autonomous manner. The autonomous vehicle 1 comprises several modules, not represented, which ensure functions of autonomous navigation such as perception, location, mission, trajectory planner, control of the vehicle, supervision of the processes and communications.

The autonomous vehicle 4 is in communication with the supervision module 1. The autonomous vehicle 4 receives through a wireless transmission the definition of a mission plan which contains a mission start date and address, the status of the predefined trajectories, and an identification of the envisaged user.

The fleet management module 2 normally makes it possible to ensure an appropriate fit between the level of battery charge of the autonomous vehicle 4 and the mission to be carried out. Thus, before carrying out a mission, the vehicle 4 has all the necessary battery charge required to carry it out.

On its parking base, the vehicle operates in autonomous mode. In the other zones where the vehicle is deployed, as well as on the site after receipt of the mission plan, the autonomous vehicle 4 enters an autonomous mode.

Internal verificatory checks are performed, in particular the main sensors are tested. The vehicle informs the control device that it is ready to commence its mission.

The vehicle 4 moves to the start address. The vehicle 4 can interact with a car park gate so as to open it and leave the car park. The vehicle 4 heads for the rendezvous point in automatic mode following predefined pathways. The speed of the vehicle is limited by taking account of the constraints imposed by data of the navigation map or the directives of the surveillance module 1.

The information relating to the speed, the position or a particular event are transmitted from the autonomous vehicle 4 to the surveillance module 1, in a periodic manner, and by a wireless communication.

If obstacles are situated on the defined trajectory, the sensors on board the vehicle communicate an item of information to processing means intended for the vehicle-integrated driving. These processing means, for example processors, determine an avoidance trajectory so as to avoid colliding with the obstacle.

When the means of calculation of the vehicle 4 do not succeed in determining an avoidance trajectory on the basis of the information received from the onboard sensors, information is received from the surveillance module 1, this information arising for example from surveillance cameras, not represented, or the like.

The surveillance module 1 can also oblige the autonomous vehicle 4 to stop until the obstacle disappears.

When the vehicle 4 is in proximity to the rendezvous point, the user is informed of its arrival, for example by email or SMS on his terminal.

If after a certain interlude, no identification is recorded, the vehicle 4 dispatches a second notification to the user. If the user still does not appear, the mission is canceled and the autonomous vehicle 4 is placed in a standby state awaiting a new mission.

If, at the chosen rendezvous point, the user identifies himself at the vehicle and the identification is validated, the vehicle allows the user to access the vehicle. Inside the vehicle, the user takes responsibility for the vehicle. The vehicle therefore passes from a mode of automatic operation to a mode of manual operation. Stated otherwise, it is the user who drives the vehicle.

When the user has finished his mission, the user drives the vehicle to a rendezvous point inside the site and releases the vehicle. The user subsequently closes his assignment of use of the vehicle, and once outside, disconnects only if nobody is in the vehicle.

The vehicle then switches to its autonomous mode. All these components are verified and data relating to this transition are dispatched to the surveillance module 1.

The vehicle moves to the parking place or to a different rendezvous point by following the instructions dispatched by the surveillance module 1. Once the vehicle has arrived at the parking place, the vehicle is directed either to a recharging point, or to a parking place, as a function of instructions received from the surveillance module 1.

If a vehicle 4 requires a recharge, a special routine is put in place so as to perform this recharge.

The user interaction system 3 can comprise for example a server with a database, so as to allow authorized users to book the autonomous vehicles for movements outside the restricted zone, and within the range of the electric vehicles.

The system 3 is also designed to manage the interaction between the vehicle 4 and the user, the handover and the consignment of the vehicle.

The user connects up and identifies himself via Intranet or Internet. Once connected the user requests a booking for an outward-return mission. The user must input certain data, such as a destination, a number of passengers, a time and a point of rendezvous to be served, as well as the date and the estimated time of return.

The fleet manager uses this information to check whether a vehicle with the desired level of autonomy is available.

In one embodiment, every user has been preregistered by including his telephone particulars for contacting him regarding his booking.

When a vehicle is identified by the manager of the fleet, a list of meeting points is proposed to the user who must choose one. After this choice, the server defines and displays a booking identifier number which also will be transmitted to the user by mobile telephone and by email. The booking process is concluded.

With this identifier, it is possible for the user to cancel or to modify his booking, to change the meeting point, the time, the date, or the like.

When the vehicle is in proximity to the defined meeting point, the user receives a message, for example an SMS, to remind him of the booking, the meeting point and the time. When the autonomous vehicle arrives at the meeting point, a second message of the SMS type is dispatched to the user to confirm the arrival thereof.

In case of difficulty encountered by the vehicle in arriving at the meeting point, the user is informed of the delay by a message. After the arrival of the autonomous vehicle at the meeting point, if the user does not arrive after a certain interlude, he receives a booking cancellation notification. The vehicle is ready to receive a new mission.

If the user is actually present, the vehicle receives identification data input by the user and undertakes an authentication. The vehicle can then authorize an opening of the doors to allow access on board.

Once inside, the user performs a manual validation action and takes complete responsibility for the vehicle. The vehicle therefore toggles into manual mode. The user is informed of this change and of the fact that control of the vehicle belongs to him completely.

The user can then drive the vehicle inside or outside the site.

Upon his return to the site, the user parks the vehicle at one of the proposed meeting points, according to his choice. The end of the mission is signaled by identifying himself once outside the vehicle. The user revalidates the consignment of the vehicle and the absence of people in the cabin.

The vehicle waits for authorization from the supervision module to toggle into autonomous mode. The supervision module 1 dispatches a message authorizing toggling into autonomous mode, and then orders the vehicle 4 to move to the car park or to a battery recharging site, or optionally to a new mission.

The invention can thus find an application in services of car valeting type. The autonomous cars may be available on a closed or open site. Provision may be made for the control device to be able to communicate with the vehicles present on the site, and, when a user drives the vehicle, for him to be authorized to perform movements outside the site. The site can for example be a site of a company or else a site of a car rental enterprise. The control device thus makes it possible to supervise all the operations of preparing the vehicle before handing this vehicle over to the client, and to retrieve all the operations of verification, cleaning etc. at the end, once the mission has been carried out.

In another embodiment, provision may be made for the autonomous vehicles to be intended to remain inside the site.

The invention can thus allow automated provision and automated parking at the end of the mission for self-service vehicle fleets with optimization of the parking area.

The invention can furthermore allow an automated recharging service based, for example, on induction or any other automated technology, this service being able in particular to permit vehicles to be made to spend part of the night on the recharging facilities just for the duration required for the programmed recharge, and optionally to reduce the number of recharging stations.

The invention can furthermore find an application in the movement of persons with reduced activity, who are without sight, dependent and/or the like, in particular on sites with defined boundaries such as housing estates for the elderly.

The invention furthermore makes it possible to rebalance in an automatic or semi-automatic manner volumes of vehicles of the various self-service parking zones.

The invention can furthermore be applied to any vehicle licensed for on-road motoring.

The invention claimed is:

1. A method of control of a terrestrial vehicle configured to adopt two modes of operation, the modes including: a manual mode, in which driving is dependent on vehicle driver commands, and an autonomous mode, in which driving is dependent on data received from sensors configured to provide information about an environment of the terrestrial vehicle and on data received from a navigation system, the method comprising:
   authorizing the autonomous mode only when the terrestrial vehicle is situated within a site determined by defined boundaries;
   receiving booking data from a user interface;
   formulating a directive message to be transmitted to the terrestrial vehicle as a function of the received booking data; and transmitting the directive message to the terrestrial vehicle so that the terrestrial vehicle autonomously moves in correspondence with the transmitted directive message,
wherein the transmitted directive message includes information relating to a user for the terrestrial vehicle.

2. The method as claimed in claim 1, wherein information comprising a battery state of charge of the terrestrial vehicle makes it possible to cause the terrestrial vehicle to go to a recharging facility autonomously.

3. The method as claimed in claim 1, wherein the transmitted directive message includes a destination address and/or a movement data.

4. The method as claimed in claim 1, wherein the transmitted directive message includes information relating to a profile of a circuit to be traveled by the terrestrial vehicle in the autonomous mode.

5. The method as claimed in claim 1, further comprising, for the terrestrial vehicle when in the autonomous mode:
   detecting a possible malfunction of the terrestrial vehicle; and
   emitting an alarm signal in case of detection of malfunction.

6. The method as claimed in claim 1, further comprising:
   receiving at least one item of state information regarding the terrestrial vehicle; and
   formulating the directive message to be transmitted to the terrestrial vehicle as a function of the received at least one item of state information.

7. The method as claimed in claim 6, further comprising:
   storing in memory vehicle state information logged subsequent to the receiving the at least one item of state information regarding the terrestrial vehicle.

8. The method as claimed in claim 1, wherein said transmitting the directive message is performed for each of a plurality of terrestrial vehicles of an assembly of terrestrial vehicles, including said autonomous terrestrial vehicle, configured to adopt the manual and autonomous modes of operation, the method further comprising:
   estimating a desired spatial distribution of the assembly of terrestrial vehicles, the directive message to be transmitted to the terrestrial vehicle being formulated as a function of the estimated distribution.

9. A non-transitory computer readable medium storing a computer program product comprising instructions, that when executed by a processor, cause performance of a method of control of a terrestrial vehicle configured to adopt two modes of operation, the modes including a manual mode, in which driving is dependent on vehicle driver commands, and an autonomous mode, in which driving is dependent on data received from sensors configured to provide information about an environment of the terrestrial vehicle and on data received from a navigation system, the method comprising:
   authorizing the autonomous mode only when the terrestrial vehicle is situated within a site determined by defined boundaries;
   receiving booking data from a user interface;
   formulating a directive message to be transmitted to the terrestrial vehicle as a function of the received booking data; and
   transmitting the directive message to the terrestrial vehicle so that the terrestrial vehicle autonomously moves in correspondence with to the transmitted directive message,
   wherein the transmitted directive message includes information relating to a user for the terrestrial vehicle.

10. A device for control of a terrestrial vehicle configured to adopt two modes of operation, the modes including: a manual mode, in which driving is dependent on vehicle driver commands, and an autonomous mode, in which driving is dependent on data received from sensors configured to provide information about an environment of the terrestrial vehicle and on data received from a navigation system, the device comprising:
   memory; and
   a processor configured to:
   authorize the autonomous mode only when the terrestrial vehicle is situated within a site determined by defined boundaries,
   formulate a directive message to be transmitted to the terrestrial vehicle as a function of booking data,
   communicate with a user interface that receives the booking data, and
   transmit the directive message to the terrestrial vehicle so that the terrestrial vehicle autonomously moves in correspondence with the transmitted directive message,
   wherein the transmitted directive message includes information relating to a user for the terrestrial vehicle.

11. The control device as claimed in claim 10, wherein the transmitted message includes a destination address, information relating to a profile of a circuit to be traveled by the terrestrial vehicle in the autonomous mode and/or movement data.

12. The control device as claimed in claim 10, wherein the processor is configured to:
   transmit directive messages to at least one terrestrial vehicle of an assembly of terrestrial vehicles, including said autonomous vehicle, so that said autonomous terrestrial vehicle autonomously moves in correspondence with the transmitted directive message,
   assist the terrestrial vehicles in their movements when the terrestrial vehicles are in the autonomous mode, and
   optimize a spatial distribution of the terrestrial vehicles within the site.

13. The control device as claimed in claim 12, wherein the processor allows an observer to move the terrestrial vehicle remotely.

14. The control device as claimed in claim 12, wherein the processor is equipped to signal remotely a presence of an emergency service vehicle in proximity to the terrestrial vehicle.

15. The control device as claimed in claim 12, wherein the processor is equipped to signal remotely a presence of an obstacle obstructing a path to be traveled by the terrestrial vehicle in the autonomous mode.

16. The control device as claimed in claim 12, wherein the control device is configured to manage one or more other vehicles of the assembly of terrestrial vehicles in addition to the terrestrial vehicle, and/or equipment of the site in communication with the control device, comprising sensors installed at the site constituting an ecosystem.

* * * * *